Patented Aug. 21, 1928.

1,681,806

UNITED STATES PATENT OFFICE.

RALPH V. HEUSER, OF BURRAGE, MASSACHUSETTS, ASSIGNOR, BY MESNE ASSIGNMENTS, TO ALBERT C. BURRAGE, JR., OF IPSWICH, MASSACHUSETTS.

VULCANIZATION OF RUBBER.

No Drawing.  Application filed January 27, 1921. Serial No. 440,518.

My invention comprises an improved method of vulcanizing rubber, and a vulcanizable composition, both characterized by the employment with rubber and a vulcanizing substance, of tritolylguanidin, preferably triorthotolylguanidin.

The function of the tritolylguanidin, whether triorthotolylguanidin, or the para- or meta-isomer, is to accelerate the vulcanization of the rubber; the properties of the ortho-variety in particular render it in all respects practical and acceptable for the purpose.

It does not suffice for an accelerator of vulcanization to possess the accelerating property or capacity alone; many organic compounds have been discovered to possess this property, but nevertheless are practically undesirable, if not useless for manufacturing purposes, either for the reason that, at or below the temperature of rubber on the grinding rolls the accelerating compound contaminates the atmosphere and injures the persons in the neighborhood, or that, at the grinding roll temperatures the compound initiates vulcanization locally, so that there are formed over-vulcanized or "burnt" spots in the rubber after the final vulcanization in the molds has been completed. The tritolylguanidins are free from these defects, while effective to accelerate rubber-vulcanization. Of the isomeric forms, the ortho is, under existing conditions, more readily and economically manufactured than its isomers, and so far as I have been able to ascertain is also equal, if not superior, to the said isomers, in those physical properties which are requisite to effective accelerative actions. The modes of preparation of the several tritolylguanidins are mutually analogous, and that which is herein described and recommended for the production of triorthotolylguanidin will suffice for an illustration.

Triorthotolylguanidin is a white, soft, powder, microcrystalline in character when precipitated from its salt solutions by means of an alkali, and because of the impalpable powdery condition in which it is thus produced, can be thoroughly and evenly distributed through rubber by the action of the grinding rolls. It has a melting point at approximately 132° C., which is about forty degrees C. higher than any temperature likely to be encountered during the grinding operation. Thus this compound remains inert during the griding, starts no premature vulcanization, and, which is quite important, does not sublimate, or evaporate at these relatively moderate temperatures, and thus leaves the air in the grinding room uncontaminated and free from any substance injurious or irritating to human beings. At ordinary temperatures triorthotolylguanidin may be freely handled, being an inert powder. It is practically insoluble in water, but readily soluble in mineral acids or their solutions. This property of solubility in mineral acids distinguishes it from the similarly constituted triparatolylguanidin.

Triorthotolylguanidin results from the interaction of one molecule of diorthotolylthiourea with one molecule of orthotoluidin and one molecule of lead oxide; the reaction is expressed by the equation:

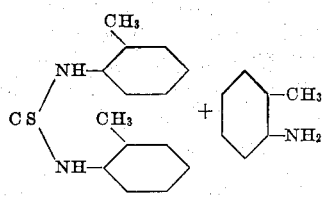 + 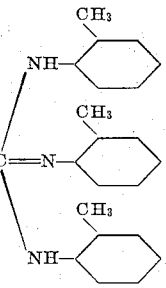

Diorthotolylthiourea is prepared by interaction of orthotoluidin and carbon bisulfid, at a temperature about 30° C., as expressed by the equation:

$$CS_2 + 2C_6H_4.CH_3.NH_2 =$$
$$CS(NH.C_6H_4.CH_3)_2 + H_2S$$

This reaction is complete only after several days. Even at the relatively low temperature prescribed, the escaping hydrogen sulfid carries with it an appreciable quantity of carbon bisulfid vapor. This can be recovered by passing the escaped vapors through cold orthotoluidin, which acts as a solvent for the carbon bisulfid; thus a charge of orthotoluidin is prepared, by reception of relatively small quantities of carbon bisulfid, for later treatment with more carbon bisulfid, to produce ditolylthiourea, and so on. The hydrogen sulfid is available for reduction processes or for the manufacture of sodium sulfid. The reaction for ditolylthiourea may be suitably carried on in shallow iron tanks, with provision for withdrawal of the vapors and facilities for turning the charge over from time to time, especially in the later stages of the operations. Continuous mechanical stirring is beneficial but not indispensable. If constant stirring of the charge is to be resorted to, a suitable apparatus will be employed.

When a charge has become nearly dry and the odor of carbon bisulfid can no longer be detected, it is tested for the amount of ditolylthiourea and free orthotoluidin; then for the triorthotolylguanidin reaction the requisite additional quantity of orthotoluidin is supplied, with lead oxide, in about 15% excess over the theoretically required quantity.

If only the theoretically required quantity of orthotoluidin is employed for the triorthotolylguanidin reaction, alcohol should be used as a solvent medium, as is recommended for other guanidin derivatives. But I have found that alcohol may be dispensed with if an excess of orthotoluidin of about 50% over the theoretically required quantity, be employed; the reaction product then remains sufficiently thin to allow the reaction to proceed to substantial completion. The lead oxid should be finely powdered; vigorous mechanical agitation, preferably involving a grinding action, should be kept up during the reaction. The triorthotolylguanidin reaction is carried out at 100° C.; the time required for completion is variable according to the thoroughness of the mechanical agitation, which accelerates it; several hours are required in any case.

When the triorthotolylguanidin reaction is substantially complete, the excess of orthotoluidin is distilled off, by means of steam, or under partial vacuum if desired. The temperature of the whole is raised to 130° C. or thereabouts, so as to retain the reaction product in fused condition to permit its withdrawal either through a draw-off cock in the bottom of the container, or by ladling out.

This product is then allowed to cool and solidify. It consists essentially of a mixture of triorthotolylguanidin and lead sulfid. These constituents are then separated by first finely crushing and powdering the mixture and then dissolving the triorthotolylguanidin in a moderately warm dilute sulfuric acid. Sulfuric acid is to be preferred over hydrochloric acid, to guard against any lead compound passing into solution. Since the final product is intended for use as an accelerator of rubber vulcanization, lead compounds, particularly lead oxid, are considered very detrimental. A slight excess of dilute sulfuric acid is required to leach out the guanidin derivative from the mixed reaction product. The acid solution (triorthotolylguanidin salt) is filtered and the lead sulfid sludge washed and dried; this may then be taken to the smelting plant and recovered as lead oxid. The filtrate is run slowly into a vat containing a sufficient amount of alkali, e. g. sodium carbonate or caustic soda, in very dilute solution; there the triorthotolylguanidin is precipitated. Vigorous agitation of the alkaline solution should be maintained, in order to ensure a finely divided precipitate. This precipitate is filtered out, washed free from sulfate (e. g. sodium sulfate) and then dried at a temperature of about 70° C.

The physical properties of this triorthotolylguanidin have been described hereinabove. When mixed with rubber and a vulcanizing agent in the usual manner—employing from one to two per cent of the triorthotolylguanidin on the weight of the rubber—this compound accelerates the vulcanization of the rubber in the molds with high efficiency, and is at the same time easy and safe to handle in its normal condition, and quite innocuous during the grinding operation.

If the para or meta isomers of triorthotolylguanidin are to be produced, the preparatory materials are, respectively, diparatolylthiourea and paratoluidin, or dimetatolylthiourea and metatoluidin; lead oxid being employed in each case, as with the ortho preparatory materials. The separation of the para or meta tritolylguanidin from the lead sulfid requires an appropriate solvent. The para isomer, for instance, is only slightly soluble in dilute mineral acids, and its separation from the lead sufid may be effected by use of chlorbenzol, in which the triparatolylguanidin is readily soluble.

Preparation of a tritolylguanidin from unseparated toluidins is, apparently, to be avoided; since I have found that the resulting mixed product has a low (though indefinite) melting point, and exhibits a tendency to fuse spontaneously with lumps at atmospheric temperatures frequently encountered in summer.

The methods herein briefly described, of producing ditolylthiourea and tritolylguanidin, form the subjects, respectively, of my applications for United States Letters Patent, Serial Numbers 440,516 and 440,517 (Patent 1,437,419, dated December 5, 1922), filed concurrently herewith.

What I claim and desire to secure by Letters Patent is:

1. The process of vulcanizing rubber, characterized by heating rubber with vulcanizing material and tritolylguanidin.

2. The process of vulcanizing rubber, characterized by heating rubber with vulcanizing material and triorthotolylguanidin.

3. The vulcanizable composition, comprising rubber, a vulcanizing agent, and tritolylguanidin.

4. The vulcanizable composition, comprising rubber, a vulcanizing agent, and triorthotolylguanidin.

5. The process of treating rubber or similar materials which comprises combining with the rubber compound an ortho-tolyl guanidine.

6. The process of treating rubber or similar materials which comprises combining with the rubber compound a vulcanizing agent and an ortho-tolyl guanidine 7. A vulcanized compound of rubber or similar material combined with a vulcanizing agent and an ortho-tolyl guanidine.

8. The process of treating rubber or similar materials which comprises combining with the rubber compound an aryl substituted guanidine having an alkyl group in the ortho position.

9. The process of treating rubber or similar materials which comprises combining with the rubber compound a vulcanizing agent and an aryl substituted guanidine accelerator having an alkyl group in ortho position.

10. A vulcanized compound of rubber or similar material combined with a vulcanizing agent and an aryl substituted guanidine accelerator having an alkyl group in ortho position.

11. The process of treating rubber or similar materials which comprises combining with the rubber compound an orthotolyl-guanidin consisting of a guanidin nucleus having only benzene-ring substitution, the only modification of any benzene ring consisting of the substitution of a $CH_3$ radical in the ortho position.

12. The process of treating rubber or similar materials which comprises combining with the rubber compound a vulcanizing agent and an orthotolylguanidin consisting of a guanidin nucleus unmodified except for the substitution of a plurality of benzene rings, the only modification of any ring consisting in the substitution of a $CH_3$ radical in the ortho position.

13. The process of treating rubber or similar materials which comprises combining with the rubber compound a vulcanizing agent and an aryl substituted guanidin accelerator having an alkyl group in the ortho position, the guanidin nucleus being unmodified except for the substitution of a plurality of benzene rings the only modification of any of which consists in the substitution of a $CH_3$ radical.

Signed by me at Boston, Massachusetts, this twentieth day of January, 1921.

RALPH V. HEUSER.